US007218531B2

(12) United States Patent
Shuey et al.

(10) Patent No.: US 7,218,531 B2
(45) Date of Patent: May 15, 2007

(54) SWITCHING REGULATOR WITH REDUCED CONDUCTED EMISSIONS

(75) Inventors: Kenneth C. Shuey, Zebulon, NC (US); Robert T. Mason, Raleigh, NC (US); Rodney C. Hemminger, Raleigh, NC (US)

(73) Assignee: Elster Electricity, LLC, Raleigh, NC (US)

( * ) Notice: Subject to any disclaimer, the term of this patent is extended or adjusted under 35 U.S.C. 154(b) by 194 days.

(21) Appl. No.: 10/818,211

(22) Filed: Apr. 5, 2004

(65) Prior Publication Data
US 2005/0218873 A1    Oct. 6, 2005

(51) Int. Cl.
*H02M 3/335* (2006.01)
*G05F 1/40* (2006.01)

(52) U.S. Cl. .......................... 363/15; 363/39; 323/282

(58) Field of Classification Search ................. 363/15, 363/39, 44, 125; 323/282, 283, 351
See application file for complete search history.

(56) References Cited

U.S. PATENT DOCUMENTS

| 4,645,883 | A  | * | 2/1987  | Horna et al. ............ 379/406.08 |
| 6,600,295 | B2 | * | 7/2003  | Kanekawa et al. ......... 323/222 |
| 6,852,564 | B2 | * | 2/2005  | Ohuchi et al. ................ 438/68 |
| 2002/0180410 | A1 | * | 12/2002 | Brooks ....................... 323/282 |

OTHER PUBLICATIONS

LNK501, LinkSwitch® Family, "Energy Efficient, CV/CC Switcher for Very Low Cost Chargers and Adapters", *Power Integrations, Inc.*, Apr. 2003, 1-20.

* cited by examiner

*Primary Examiner*—Adolf Berhane
(74) *Attorney, Agent, or Firm*—Woodcock Washburn LLP

(57) ABSTRACT

A fixed-frequency switching regulator having a noise injection circuit. Noise is injected into the feedback loop of the switching regulator to modify the switching waveform to reduce individual frequency harmonics of the resultant Fourier Series. The reduced frequency harmonics allow the switching regulator to achieve reduced conducted emissions.

14 Claims, 4 Drawing Sheets

SWITCHING REGULATOR WITH REDUCED CONDUCTED EMISSIONS

FIELD OF THE INVENTION

This invention generally relates to the field of power supplies. More particularly, this invention relates to a system and method of reducing conducted emissions in a fixed-frequency switching regulator to meet CISPR 22 requirements.

BACKGROUND OF THE INVENTION

Recently, the Federal Communications Commission (FCC) has imposed limits on conducted and radiated emissions from unintentional radiators to update the references to Publication 22 of the International Electrotechnical Commission (IEC), International Special Committee on Radio Interference (CISPR). It is difficult for electronic devices, such as devices that include fixed-frequency, switching power supplies to meet CISPR 22, as it requires diligence in component selection and printed circuit board layout.

The operation of a conventional fixed-frequency switching regulator will now be described with FIG. 1. The switching regulator 100 utilizes a LinkSwitch integrated circuit from Power Integrations, Inc., and includes an internal MOSFET switching element. During power up, as VIN is first applied, the CONTROL pin (C) capacitor C1 is charged through a switched high voltage current source connected internally between the DRAIN and CONTROL pins (D and C, respectively). When the CONTROL pin C voltage reaches approximately 5.6 V relative to the SOURCE pin S, the high voltage current source is turned off, the internal control circuitry is activated and the high voltage internal MOSFET begins to switch. At this point, the charge stored on C1 is used to supply the internal consumption of the chip.

As the output voltage, and therefore the reflected voltage across the primary transformer winding ramps up, the feedback CONTROL current $I_C$ increases. When $I_C$ exceeds $I_{DCS}$, typically 2 mA, the maximum duty cycle is reduced. R1 is initially selected to conduct a value of $I_C$ approximately equal to $I_{DCT}$ when $V_{OUT}$ is at the desired value at the minimum power supply input voltage. When the duty cycle drops below approximately 4%, the frequency is reduced, which reduces energy consumption under light load conditions.

When a fault condition, such as an output short circuit or open loop, prevents flow of an external current into the CONTROL pin (C), the capacitor C1 discharges towards 4.7 V. At 4.7 V, an autorestart is activated, which turns the MOSFET off and puts the control circuitry in a low current standby mode. In auto-restart, the LinkSwitch device periodically restarts the power supply so that normal power supply operation can be restored when the fault is removed.

An optical isolator feedback is used to improve output voltage regulation. To implement the optical isolator regulation, resistor R3, capacitor C3 and optical isolator (transistor) U1 are included on the primary side, where resistor R3 forms a potential divider with resistor R1 to limit the transistor U1 collector emitter voltage. On the secondary side, voltage sense circuit components resistor R5, Zener diode VR1 and LED D2 provide a voltage feedback signal. In the exemplary circuit shown, the Zener diode VR1 reference is used to provide output voltage tolerancing and cable drop compensation, if required. Resistor R4 provides biasing for the Zener diode VR1. The regulated output voltage is equal to the sum of the Zener diode (VR1) voltage plus the forward voltage drop of the LED D2. Resistor R5 is an optional low value resistor to limit LED D2 peak current due to output ripple.

The feedback configuration is a resistive divider made up of resistor R1 and resistor R3 with diode D1, resistor R2, capacitor C1 and capacitor C2 rectifying, filtering and smoothing the primary winding voltage signal. The optical isolator therefore adjusts the resistor divider ratio to control the DC voltage across resistor R1 and therefore, the feedback current received by the LinkSwitch CONTROL pin (C). When the power supply operates in the constant current (CC) region, for example when charging a battery, the output voltage is below the voltage feedback threshold defined by LED D2 and Zener diode VR1 and the optical isolator is fully off.

When the output reaches the voltage feedback threshold set by LED D2 and Zener diode VR1, the optical isolator turns on. Any further increase in the power supply output voltage results in the transistor U1 current increasing, which increases the percentage of the reflected voltage appearing across resistor R1. The resulting increase in the LinkSwitch CONTROL current reduces the duty cycle according and therefore, maintains the output voltage regulation.

Typically, resistors R1 and R3 are equal in value. However, increasing resistor R3 (while reducing R1 to keep R1+R3 constant) increases loop gain in the constant voltage (CV) region, improving load regulation. The extent to which resistor R3 can be increased is limited by optical isolator transistor voltage and dissipation ratings and should be fully tested before finalizing a design.

With a constant load, the tightly controlled feedback loop of the switching regulator 100 keeps the output voltage VOUT of the switcher very stable. This closed loop system maintains a constant switching waveform that results in repetitive, Fourier Series frequency components as shown in FIG. 2.

Many older electronic devices, such as electronic meters, that include wide range power supply modules, use a switching regulator such as that shown in FIG. 1. Typically, these switching supplies were required to meet FCC part 15 emissions requirements for class B computing devices. Achieving a significant margin below the CISPR 22 requirement is very difficult using a fixed-frequency converter because of the sharp, narrow bandwidth harmonics of the switcher. In addition, many electronic devices must minimize hardware cost while maximizing functionality to be competitive. One of the major hardware elements within, e.g., an electronic meter, that has these constraints is the power supply. Typically, an electronic meter supply must work over an extended input AC voltage range, develop sufficient output power to supply a variety of communication options and meet the latest levels of conducted EMI per CISPR 22 rules. These requirements are not easily accomplished while minimizing cost.

Thus, there is significant probability that option boards, component changes and different meter configurations will add frequency elements or conduction paths that will not meet CISPR 22. As such, there is a need for a switching regulator that is both cost effective and that has a reduced emissions to more easily enable electronic devices to meet CISPR 22 requirements. The present invention provides such a solution.

SUMMARY OF THE INVENTION

The present invention is directed to fixed-frequency switching regulator systems and methods for the same. In accordance with a first aspect of the invention, there is provided a switching regulator including a transformer having a primary winding and a secondary, a fixed-frequency switching element connected in series with the primary winding, a controller provided to control the switching element, a rectifying circuit connected to the secondary winding, and a noise source injecting a signal into the rectifying circuit.

According to a feature of the invention, the noise source injects a random noise signal into the rectifying circuit to create a ripple voltage in an output voltage of the switching regulator. The ripple voltage causes the controller to alter the duty cycle of the fixed-frequency switching element. The random noise signal is preferably between 50 and 75 mV.

According to another feature of the invention, the regulator may include an optical isolator circuit to provide closed-loop control of the switching regulator.

According to another aspect of the invention, there is provided a switching regulator having a transformer having a primary winding and a secondary winding, a controller having a fixed-frequency switching element where a duty cycle of the fixed-frequency switching element is determined in accordance with a closed-loop feedback circuit, a rectifying circuit connected to the secondary winding, and a random noise signal injected into the rectifying circuit. The random noise signal creates a ripple voltage in an output voltage of the switching regulator.

According to features of the invention, the duty cycle of the fixed-frequency switching element is modified by the random noise signal. In addition, an optical isolator circuit to may provide closed-loop control of the switching regulator. Preferably, the random noise signal is between 50 and 75 mV.

In accordance with another aspect of the invention, there is provided a method of controlling a fixed-frequency switching regulator, where the regulator includes a transformer having a primary winding and a secondary winding; a fixed-frequency switching element connected in series with the primary winding; a controller; and a rectifying circuit connected to the secondary winding. The method comprises injecting a noise source into the rectifying circuit; detecting an output voltage of the switching regulator; and controlling a duty cycle of the fixed-frequency switching element in accordance with the output voltage.

According to additional features of the invention, the method may further include generating a random noise signal as the noise source, and creating a ripple voltage in the output voltage of the switching regulator. The method may also alter a duty cycle of the fixed-frequency switching element in response to the random noise signal. As such, the method may provide for a fixed-frequency switching regulator that generates broadband conducted frequency components.

According to another aspect of the present invention, there is disclosed a method of controlling a fixed-frequency switching regulator that includes detecting an output voltage of the switching regulator, randomly modifying an applied load receiving the output voltage; and controlling a duty cycle of the fixed-frequency switching element in accordance with the output voltage.

According to a feature of the invention, randomly modifying the applied load receiving the output voltage includes generating a random noise signal in a microcontroller, and creating a ripple voltage in the output voltage of he switching regulator by randomly pulling a pin on the microcontroller high and low. As such, the applied load may vary approximately 30 mA.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The present invention provides a method by which a low cost, fixed-frequency switching converter 1C can be utilized to provide a robust power supply while achieving an improved operating margin below CISPR 22 conducted limits. The design technique achieves improved conducted EMI margin with almost no additional hardware cost.

Figure 1:
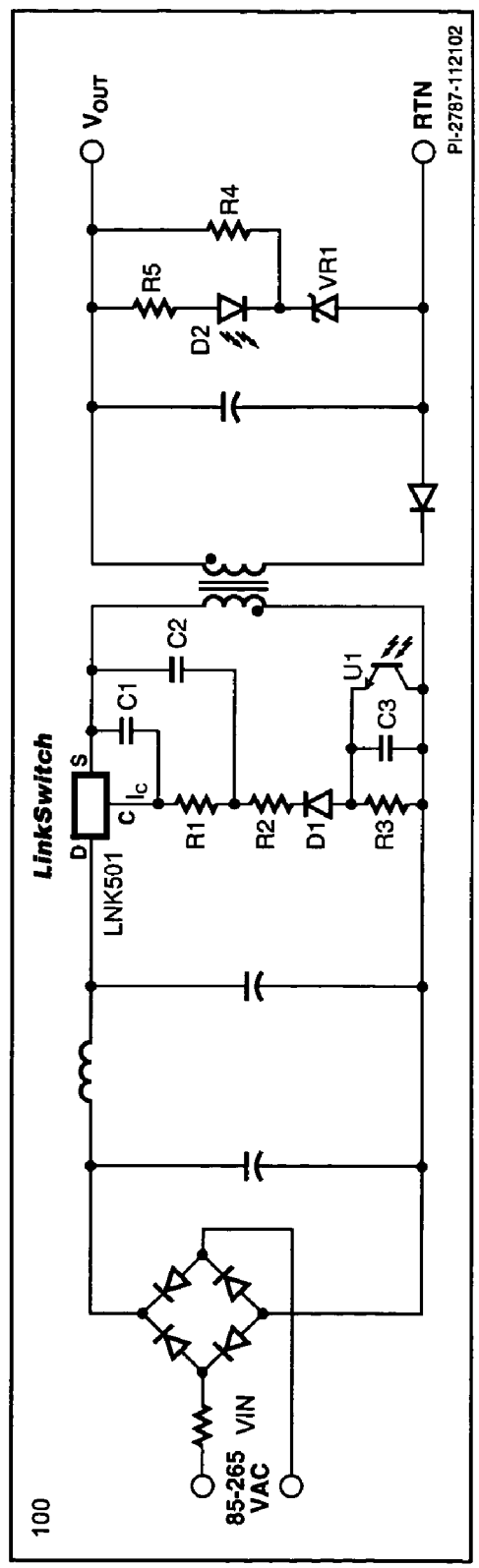
FIG. 1 is a schematic of a conventional switching regulator having a fixed-frequency switching element.
Figure 3:
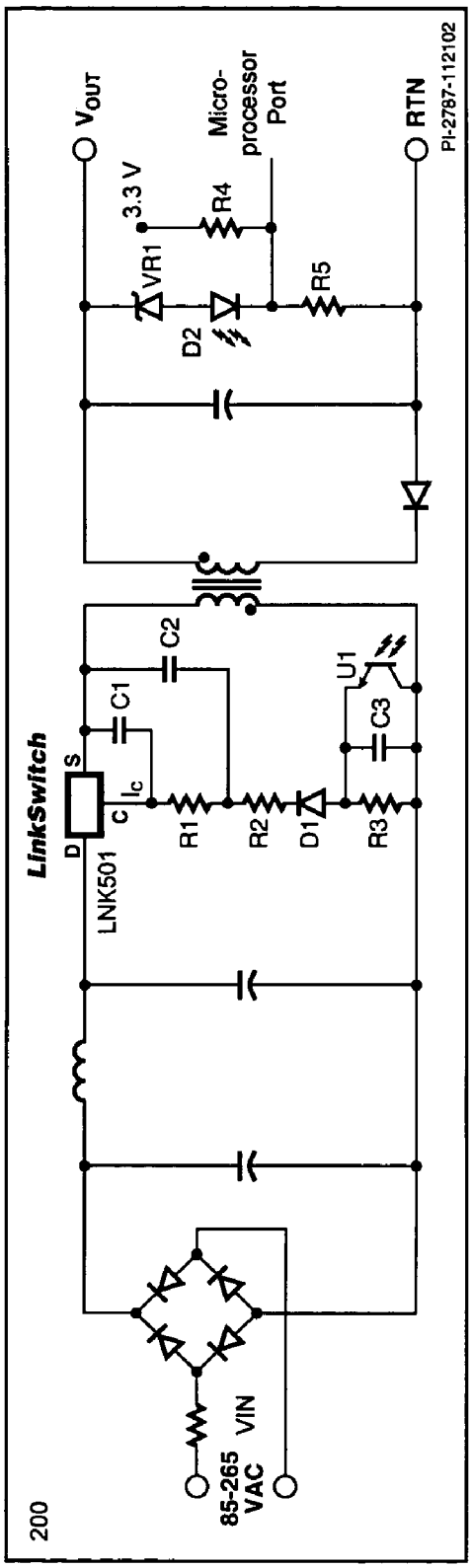
FIG. 3 is a schematic of a switching regulator having a fixed-frequency switching element in accordance with the present invention.

FIG. 3 shows the fixed-frequency power supply of FIG. 1 with a modification to the closed loop feedback system in accordance with the present invention. The modification to the feedback loop includes injecting a small noise source into the optical isolator current sensing circuit. To accomplish this, a microcontroller (not shown) develops a random output waveform on a port pin in accordance with a random number generator. This random switch pattern is used to alter the voltage in the series sensing string that includes the optical isolator by changing the voltage created by the resistor divider R4/R5. By inserting a several millivolt signal of random voltage (approximately 50–75 mV) into the sensing circuit, the closed loop control system is forced to control the output voltage to match this ripple voltage. For the switcher to include the random ripple voltage in the output, the constant switching pattern must be modified so that the switcher duty cycle is constantly changing.

Figure 2:
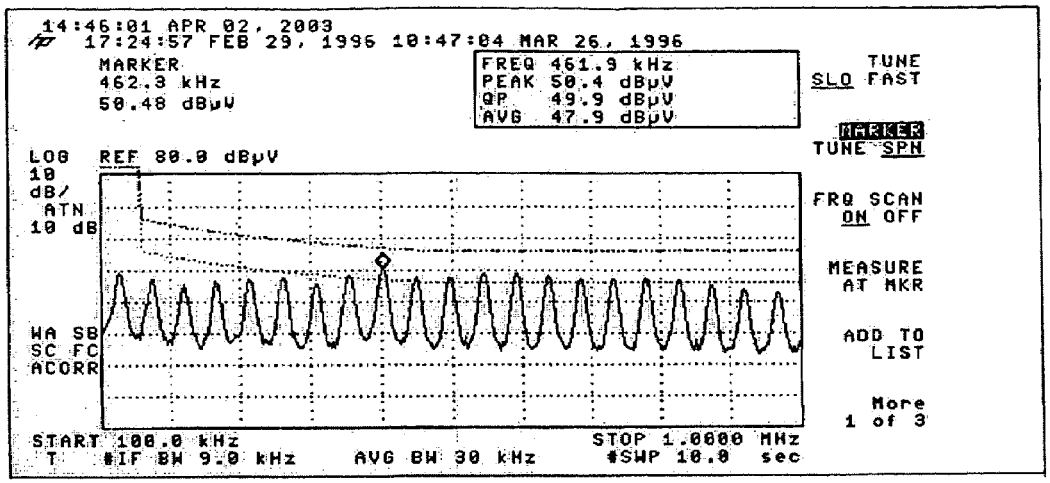
FIG. 2 is a graphical illustration of the frequency emissions generated by the switching regulator of FIG. 1.
Figure 4:
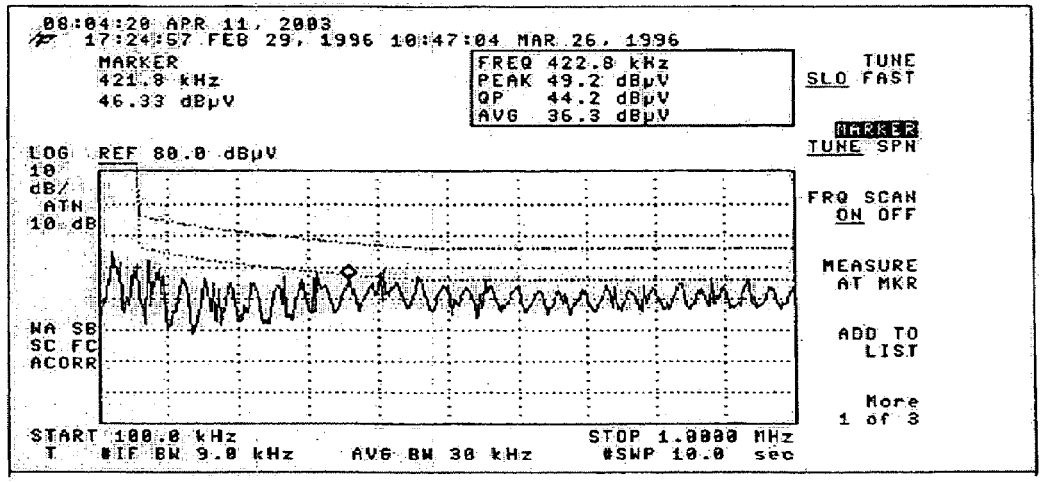
FIG. 4 is a graphical illustration of the frequency emissions generated by the switching regulator of FIG. 3.

Referring now to FIG. 4, there is shown the result of the random switching pattern that modifies the Fourier Series frequency components. The result is that the narrow, repetitive conducted spectrum (FIG. 2) changes to a more broadband spectrum. The broadband harmonic generation results without any other significant affect on the regulator performance.

In the design cases where the LinkSwitch is utilized without an optical isolator closed loop feedback, there may not be a point in the system where it is convenient to inject random noise to alter switching characteristics. One option is to utilize the random switching waveform to slightly modify the system load. As an example, if several milliamps of load current is randomly connected to the output of the switcher, the switching controller is required to randomly change its switching pattern to follow the load characteristic. This has the same effect as injecting noise into the feedback loop. The more loading that is randomized the more the effect on the switching waveform and the resulting Fourier Series conducted components.

Figure 5:
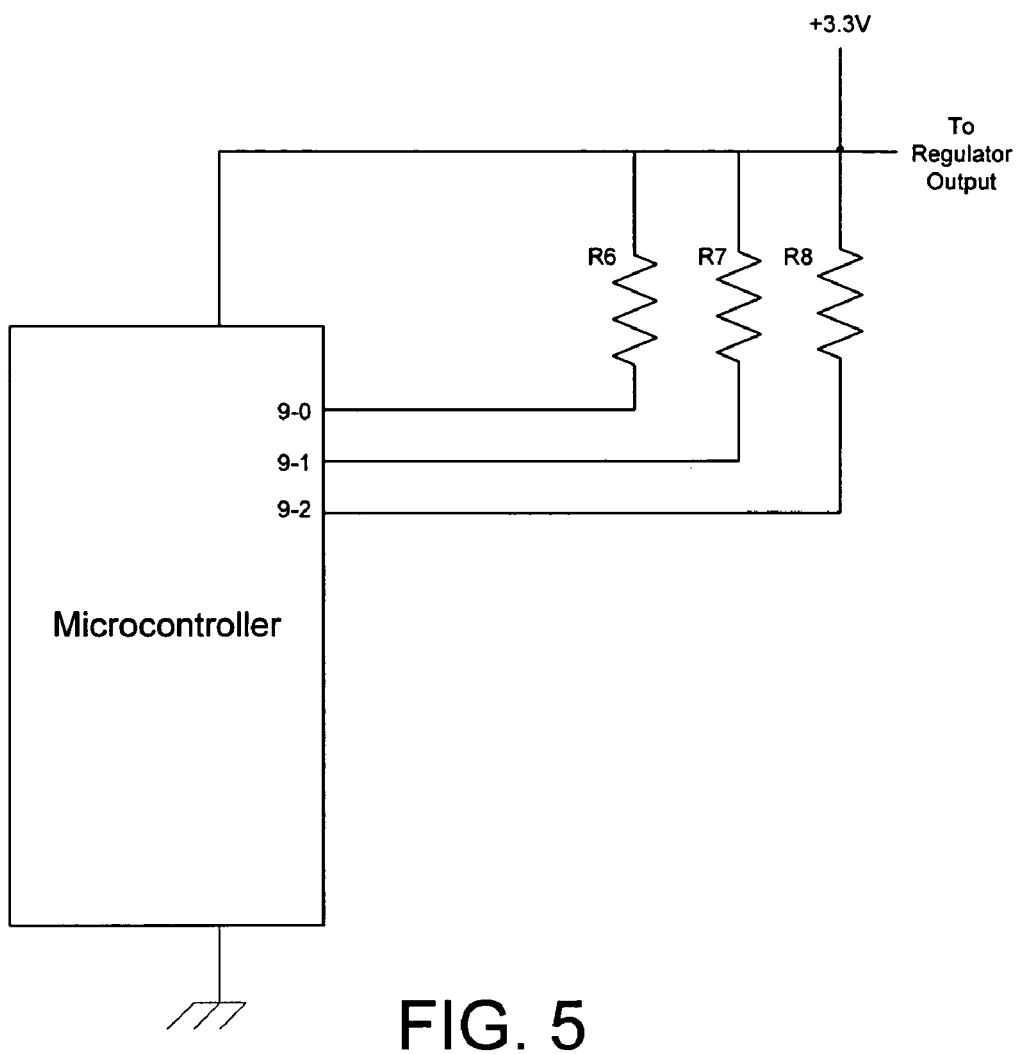
FIG. 5 is a schematic diagram of a placing a variable load on the switching regulator of the present invention.

An exemplary implementation of the above is illustrated in FIG. 5. The random output waveform (described above) that is produced by the microcontroller in accordance with the random number generator is used to activate three ports on the microcontroller (e.g., ports 9-0, 9-1 and 9-2). Each of these ports is preferably a high current port. Pull-up resistors R6, R7 and R8 are each rated at 330 ohms and are connected to 3.3V source. When the random output waveform program has a port pin pulled low it will sink 10 mA. When the random output waveform program has the port pin high it sinks no current. This results in a continuous modulation of about 30 mA of load onto the supply, which provides several dB of reduction in conducted interference.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A switching regulator comprising:
   a transformer having a primary winding and a secondary winding;
   a fixed-frequency switching element connected in series with said primary winding;
   a controller provided to control said switching element;
   a rectifying circuit connected to said secondary winding; and
   a noise source injecting a signal into said rectifying circuit to reduce emissions,
   wherein said noise source injects a random noise signal into said rectifying circuit to create a ripple voltage in an output voltage of said switching regulator.

2. The switching regulator of claim 1, wherein a duty cycle of said fixed-frequency switching element is modified by said random noise signal.

3. The switching regulator of claim 2, wherein said random noise signal is between 50 and 75 mV.

4. The switching regulator of claim 1, further comprising an optical isolator circuit to provide closed-loop control of the switching regulator.

5. A switching regulator comprising:
   a transformer having a primary winding and a secondary winding;
   a controller having a fixed-frequency switching element, a duty cycle of said fixed-frequency switching element being determined in accordance with a closed-loop feedback circuit;
   a rectifying circuit connected to said secondary winding; and
   a random noise signal injected into said rectifying circuit, said random noise signal creating a ripple voltage in an output voltage of said switching regulator.

6. The switching regulator of claim 5, wherein the duty cycle of said fixed-frequency switching element is modified by said random noise signal.

7. The switching regulator of claim 6, further comprising an optical isolator circuit to provide closed-loop control of the switching regulator.

8. The switching regulator of claim 7, wherein said random noise signal is between 50 and 75 mV.

9. A method of controlling a fixed-frequency switching regulator, the regulator including a transformer having a primary winding and a secondary winding; a fixed-frequency switching element connected in series with said primary winding; a controller; and a rectifying circuit connected to said secondary winding, the method comprising:
   injecting a noise source into said rectifying circuit;
   detecting an output voltage of said switching regulator;
   controlling a duty cycle of said fixed-frequency switching element in accordance with said output voltage;
   generating a random noise signal as said noise source; and
   creating a ripple voltage in said output voltage of said switching regulator.

10. The method of claim 9, further comprising altering a duty cycle of said fixed-frequency switching element in response to said random noise signal.

11. The method of claim 9, wherein said random noise signal is between 50 and 75 mV.

12. The method of claim 9, wherein said fixed-frequency switching regulator generates broadband conducted frequency components.

13. A method of controlling a fixed-frequency switching regulator, the regulator including a transformer having a primary winding and a secondary winding; a fixed-frequency switching element connected in series with said primary winding; a controller; and a rectifying circuit connected to said secondary winding, the method comprising:
   detecting an output voltage of said switching regulator;
   randomly modifying an applied load receiving said output voltage, wherein randomly modifying said applied load receiving said output voltage comprises generating a random noise signal in a microcontroller, and creating a ripple voltage in said output voltage of said switching regulator by randomly pulling a pin on said microcontroller high and low; and
   controlling a duty cycle of said fixed-frequency switching element in accordance with said output voltage.

14. The method of claim 13, wherein said applied load varies approximately 30 mA.

* * * * *